United States Patent
Lund et al.

(10) Patent No.: US 7,063,247 B1
(45) Date of Patent: Jun. 20, 2006

(54) POWER DRIVEN EQUIPMENT UTILIZING HYDROGEN FROM THE ELECTROLYSIS OF WATER

(75) Inventors: Bruce D. Lund, Jackson River Forest, IL (US); Michael Starrick, Maywood, IL (US)

(73) Assignee: Lund and Company Invention, LLC, Chicago, IL (US)

( * ) Notice: Subject to any disclaimer, the term of this patent is extended or adjusted under 35 U.S.C. 154(b) by 57 days.

(21) Appl. No.: 10/949,565

(22) Filed: Sep. 24, 2004

Related U.S. Application Data (63) Continuation-in-part of application No. 10/392,415, filed on Mar. 19, 2003, now Pat. No. 6,796,387.

(51) Int. Cl.
*F02B 43/08* (2006.01)

(52) U.S. Cl. .................. 227/10; 227/129; 227/156; 60/275; 60/286; 123/3; 123/286; 173/104; 173/170; 173/171

(58) Field of Classification Search ............... 173/104, 173/114, 169, 170, 171; 227/10, 129, 156; 60/286, 275, 273, 284; 123/3, 25 B, 306
See application file for complete search history.

(56) References Cited

U.S. PATENT DOCUMENTS

| | | | | |
|---|---|---|---|---|
| 2,673,069 | A * | 3/1954 | Carpenter | 175/93 |
| 4,051,909 | A * | 10/1977 | Baum | 175/93 |
| 4,377,991 | A * | 3/1983 | Liesse | 123/46 SC |
| 4,570,578 | A * | 2/1986 | Peschka et al. | 123/1 A |
| 5,392,740 | A * | 2/1995 | Teramoto et al. | 123/3 |
| 5,799,739 | A * | 9/1998 | Takaada et al. | 173/217 |
| 5,842,623 | A * | 12/1998 | Dippold | 227/10 |
| 6,484,491 | B1 * | 11/2002 | Thordarson | 60/211 |
| 6,571,542 | B1 * | 6/2003 | Fillman et al. | 56/10.6 |
| 6,796,387 | B1 * | 9/2004 | Lund et al. | 173/104 |

* cited by examiner

*Primary Examiner*—Scott A. Smith
(74) *Attorney, Agent, or Firm*—Much Shelist Freed Denenberg Ament & Rubenstein PC (57) ABSTRACT

Applicant's novel invention relates to a novel hydrogen generator for supplying hydrogen to drive a hydrogen operated engine. The regulator can supply hydrogen to drive an engine for operating the cutter assembly of a lawnmower as well as supply the output of a hydrogen driven engine to operate a variety of power operated devices such as drills, saws, sanders, etc. In addition, the hydrogen generator can supply hydrogen to operate a power driven piston to drive fasteners.

6 Claims, 9 Drawing Sheets

POWER DRIVEN EQUIPMENT UTILIZING HYDROGEN FROM THE ELECTROLYSIS OF WATER

This application is a continuation-in-part application of Lund et al. application entitled Power Driven Equipment Utilizing Hydrogen From The Electrolysis Of Water filed on Mar. 19, 2003 having Ser. No. 10/392,415 now U.S. Pat. No. 6,796,387.

BACKGROUND OF THE INVENTION

The present invention relates generally to a novel hydrogen generator to supply hydrogen to power a variety of devices that are designed to operate on hydrogen as a fuel such as power tools, including nailers, saws, etc., lawnmowers, snow blowers, power driven toys such as rockets or remote controlled vehicles and planes, and other equipment that can be adapted to use hydrogen as a fuel source. The present invention also includes novel combinations of a hydrogen generator of various types with equipment, such as a lawnmower, fastener driving tool, and a mechanism for driving a variety of devices. By eliminating the typical gasoline fueled engines and replacing it with one fueled by hydrogen, environmental polluting gases are no longer created and you have a source of power that is extremely efficient, long lasting, quiet, and inexpensive. Also, when integrating a generator with a variety of equipment, the units so supplied will run very efficiently, can be readily operated in any kind of weather, and will be safe and easy to handle.

SUMMARY OF THE INVENTION

There is illustrated and described herein unique compact hydrogen generators that take up a relatively small space and can operate on a readily available home electrical supply. The generator is capable of supplying hydrogen to a hydrogen operated engine or filling a tank with high pressure hydrogen that will serve as fuel for an equipment power source that has been designed to operate with hydrogen. The generators illustrated are only intended to be representative and can be made whatever size is desired as determined by the rate at which hydrogen is to be generated and the size of the tank to be filled under a predetermined pressure. While unique hydrogen generators are described and claimed herein, different designs of hydrogen generators can be employed as a unique combination with various types of equipment.

Also illustrated and described herein are novel lawnmower assemblies that have been designed to use hydrogen as a fuel; novel fastener driving tools that operate on hydrogen as well as novel hydrogen operated power tool systems that can be connected to any number of power driven tools such as a rotating or reciprocating saw, drill or sander, and a self-contained hydrogen operated power tool such as a riveter.

Other features and advantages will be apparent from the following drawings and descriptions thereof.

BRIEF DESCRIPTION OF THE DRAWINGS

FIG. 2 is a side view of a hydrogen operated tool system that can be used to power various types of equipment as illustrated in FIGS. 3–6 wherein

FIG. 6 is a reciprocating saw;

DETAILED DESCRIPTION OF THE DRAWINGS

Figure 1:
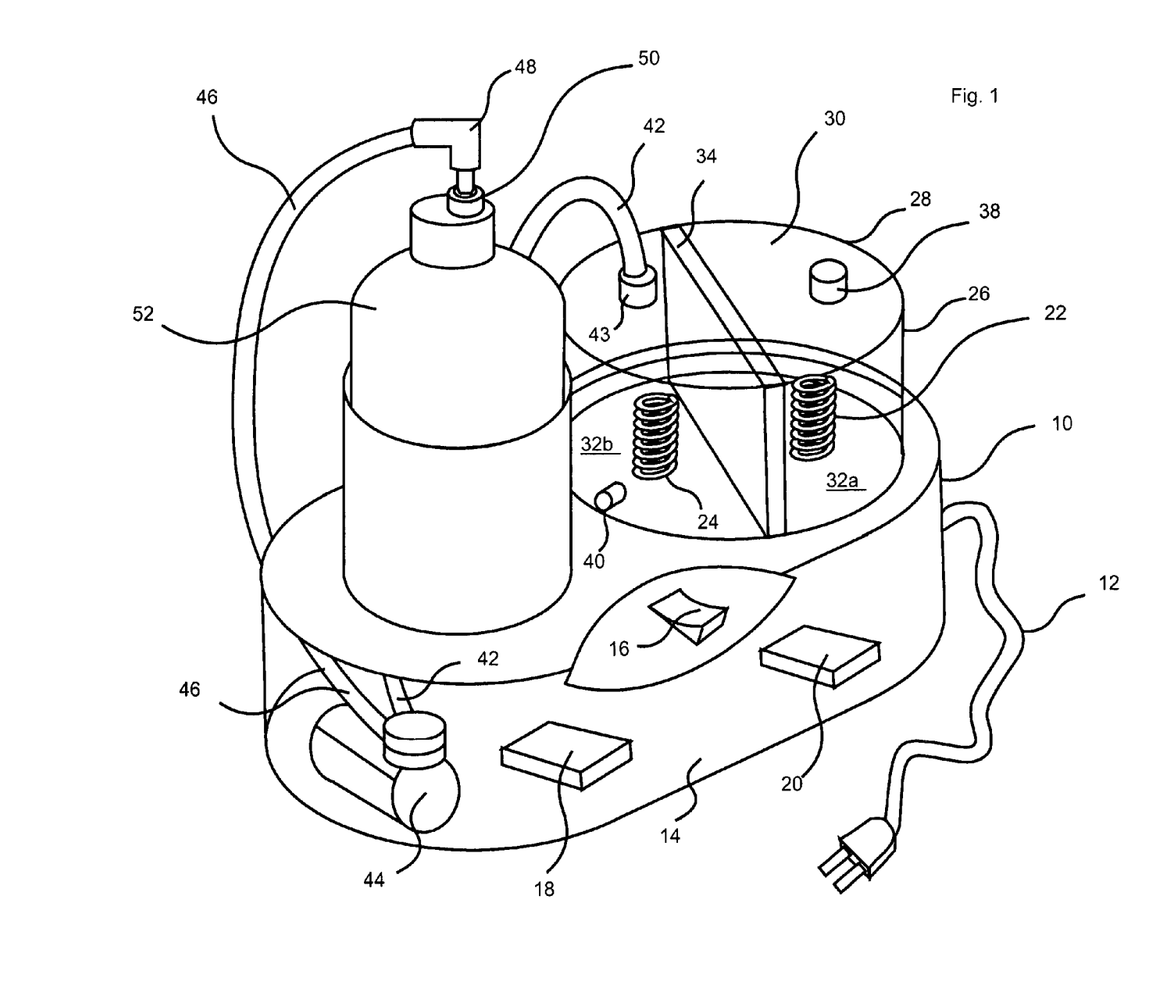
FIG. 1 is a perspective view of a novel hydrogen generator.

Referring now to FIG. 1, there is illustrated applicants' novel generator 10 for generating and storing hydrogen which generator is supplied power through a power cord/plug assembly 12. The novel generator 10 is a compact unit adapted to sit on a floor or shelf or to be mounted on equipment that uses hydrogen as a source of engine fuel, such as a lawnmower or snow blower. The generator includes a base housing 14 in which are located a number of components that are schematically illustrated. These include a switch 16 that controls the flow of line voltage to the voltage rectifier 18 and a microprocessor 20. The voltage rectifier 18 supplies DC voltage to the anode 22 and cathode 24 located in the containment vessel 26 fitted into the base housing 14. The containment vessel 26 is in the form of a generally cylindrical housing 28 having a closed top 30. The cylindrical chamber in the containment vessel 26 is divided into 2 generally semi-cylindrical chambers 32a, 32b by a non-permeable divider 34 that allows the liquid to flow freely in the bottom portion of the containment vessel 26 for the free flow of electrons between the anode 22 and the cathode 24. This non-permeable divider 34 prevents gas migration once separation has occurred. Located in the chamber is the anode 22 which, when activated, acts to generate oxygen from the water or water and citric acid located in the chamber 32a. A vent 38 is provided in the top wall 30 of this chamber 32a to vent the oxygen therefrom, which vent 38 is controlled by the microprocessor 20.

Located in the chamber 32b is the cathode 24 which, when activated, generates hydrogen from the water in the chamber 32b. When sufficient hydrogen gas is produced by the cathode 24 the liquid level in chamber 32b will be reduced and the liquid level indicator 40 will send a signal to the microprocessor 20 to activate the compressor 44. The hydrogen from the chamber 32b is drawn by the compressor through a low pressure hose 42 connected to an adaptor 43 that leads to the compressor 44 located in the base housing 14. The hydrogen gas from the low pressure hose 42 is compressed in the compressor 44 and hydrogen gas under a high pressure flows from the compressor 44 into a high pressure hose 46 through a coupler 48 and receptacle 50 in the top of the tank 52. The tank 52 filled with hydrogen gas under pressure can be removed from the generator and used as a source of fuel for any number of mechanisms, including the lawnmower, gun nailer, and portable power tool system for operating saws, drills, etc., as illustrated and described herein.

Figure 9:
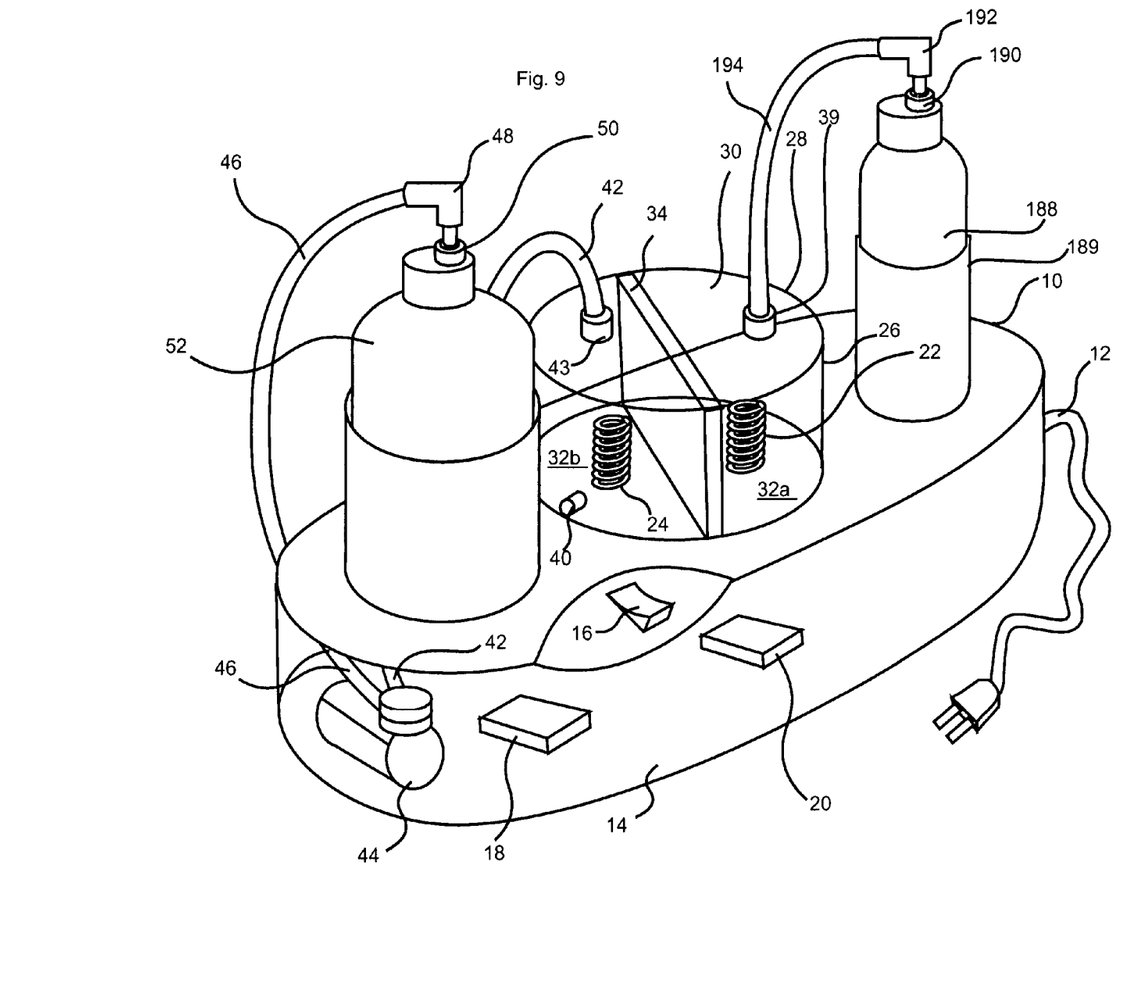
FIG. 9 is a perspective view of a second embodiment of a novel hydrogen generator.

A second embodiment of a novel hydrogen generator is illustrated in FIG. 9. This embodiment has a number of parts that are identical to the embodiment shown in FIG. 1 and the description of said identical parts are spelled out above and the differences therefrom are set forth hereinafter.

Specifically in FIG. 9 the vent 38 of the embodiment if FIG. 1 is replaced with a flow control device 39 that controls the flow of oxygen from chamber 32a to tank 188 located in a holder 189 on the top wall of the generator. The high pressure oxygen transfer hose 194 connects the control device 39 to the coupler 192 and oxygen receptacle 190 at the top of tank 188. This allows for the collection of oxygen under pressure as the oxygen is being generated. The flow control device may be controlled by the microprocessor 20.

It is to be noted that if desired the compressor 44 can be eliminated and a hose directly connecting the fitting 43 to fill the container 52 with hydrogen can be employed.

Figures 2, 6:
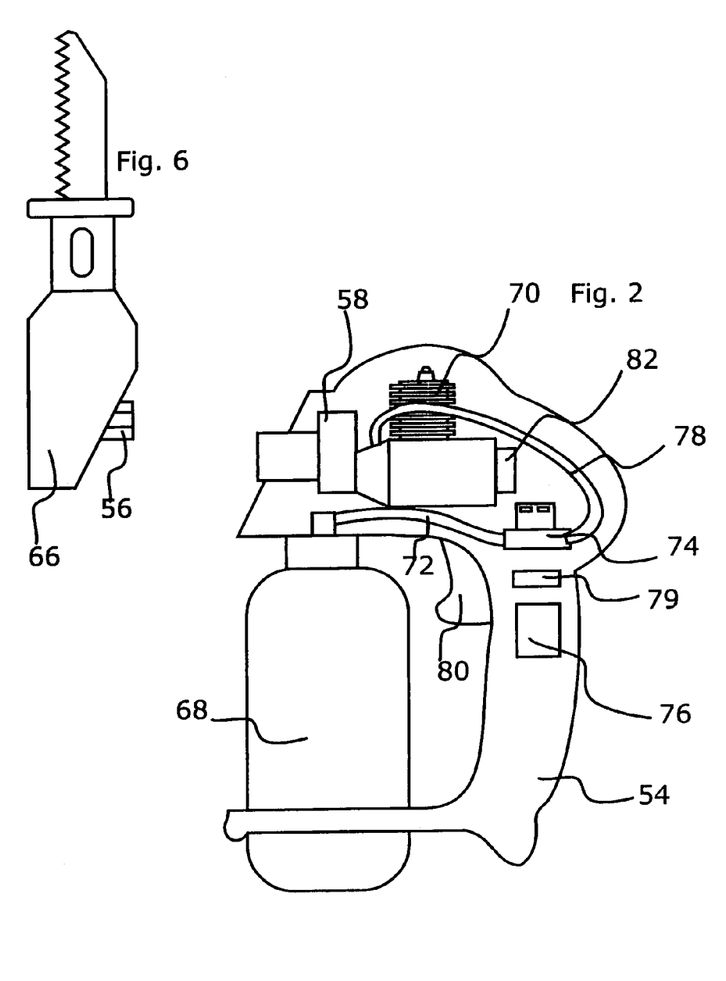
Figure 3:
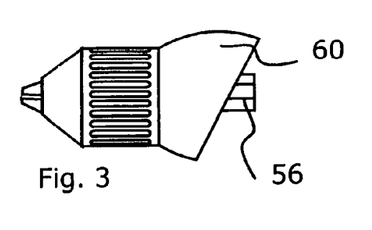
FIG. 3 is a drill.
Figure 4:
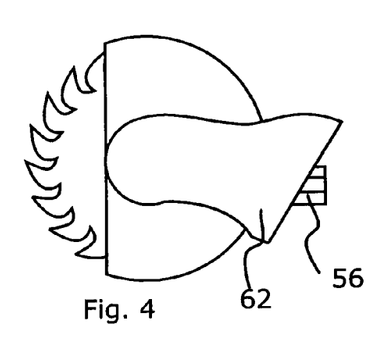
FIG. 4 is a circular saw.
Figure 5:
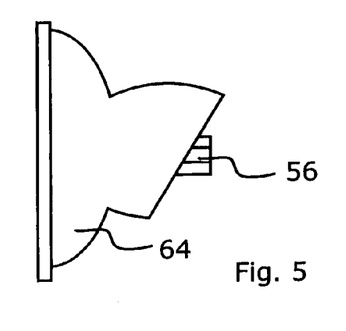
FIG. 5 is a sander.

Another novel development by applicants is the hydrogen power tool system illustrated in FIG. 2. There is shown a power tool assemblage 54 that uses the hydrogen as a source of power for driving a gear system that is designed to be connected to a drive shaft 56 that is part of the ancillary equipment to be operated. The gear system 58 can be connected up to the drive of drill 60 in FIG. 3, the rotating saw 62 of FIG. 4, the sander 64 of FIG. 5 or the reciprocating saw 66 of FIG. 6. These are but representative of tools that can be driven by the hydrogen power system.

The novel hydrogen operated system includes a power tool assembly 54 that, as aforementioned, can be connected to the different output devices illustrated in FIGS. 3–6 to perform their respective work tasks. The power tool assembly 54 includes the refillable storage tank 68 containing hydrogen gas under pressure. The hydrogen operated engine 70 is fed hydrogen through a high pressure line 72 to a solenoid valve 74. The solenoid 74 is controlled by a microprocessor 76 to deliver a predetermined amount of hydrogen gas to the engine 70 through a high pressure hose 78 and actuate a piezo starter 79 or other ignition devices. The input from the rheostat trigger 80 determines the amount of hydrogen gas delivered to the engine 70.

The output from engine 70 is routed through a gear system 58 to increase torque and slow the output of the gear system 58 to device input shaft 56.

The configuration of the power tool assemblage 54 can be such that whenever the rheostat trigger 80 is released the engine 70 will come to a stop by means of the crank position sensor/brake 82 in the correct position for restart. Upon pressing the rheostat trigger 80 again the power tool assemblage 54 can restart the engine 70 to resume work by using a preset program. The microprocessor 76 opens the solenoid valve 74 to allow a predetermined amount of hydrogen gas to flow to the engine 70, and activates the piezo starter 79 to start the engine 70. During operation the output shaft of the gear system 58 is connected up to the input shaft 56 of any of the devices shown in FIGS. 3–6, after which the rheostat trigger 80 is pulled to start the engine 70 to drive the respective input shaft and associated device.

Figure 10:
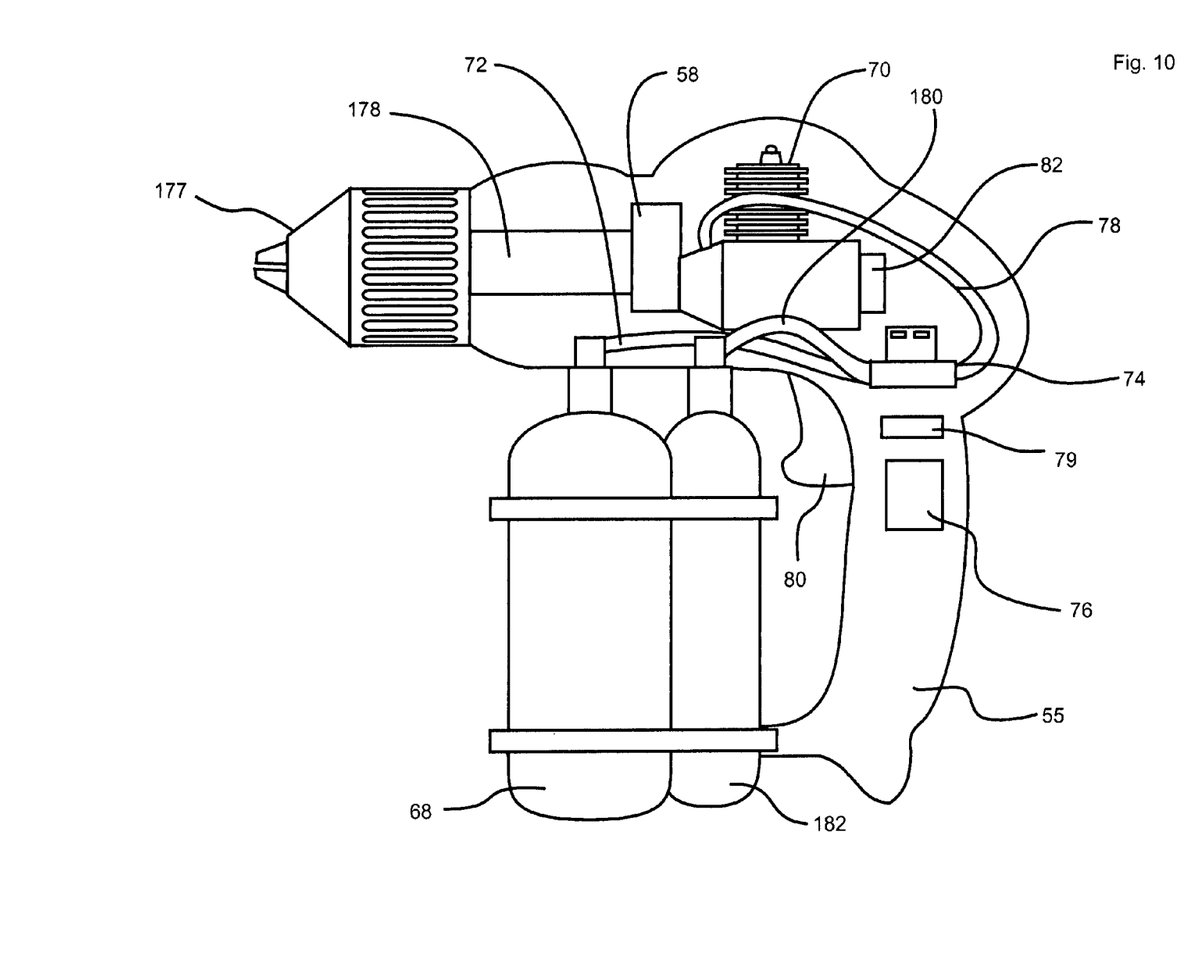
FIG. 10 is a side view of a novel hydrogen operated tool.

A self-contained hydrogen operated tool 55 is shown in FIG. 10. Here again there are many components of the tool 55 that are identical to the tool 54 of FIG. 2 and thus the comparable parts are given the same number. The tool 55 includes a drill chuck 177 that is operated by drill shaft 178 connected to the gear system 58. The tool 55 includes an oxygen tank 182 that is used to boost the performance so that the same tool can perform greater work. The oxygen may be transferred through high pressure oxygen delivery hose 180 to an oxygen solenoid (not shown) and through a second high pressure oxygen hose (not shown) into the engine 70. This would allow more hydrogen to be added to the engine so the new result would be more power output. The oxygen is used whenever the consumer desires more power.

It can be appreciated that what is provided is a very simple, inexpensive power tool or an assemblage that is easy to carry around with the various devices to operate them wherever desired. The engine 70 is environmentally safe and the operator is not subject to the noxious fumes that emanate from a gasoline-fired engine.

Figure 11:
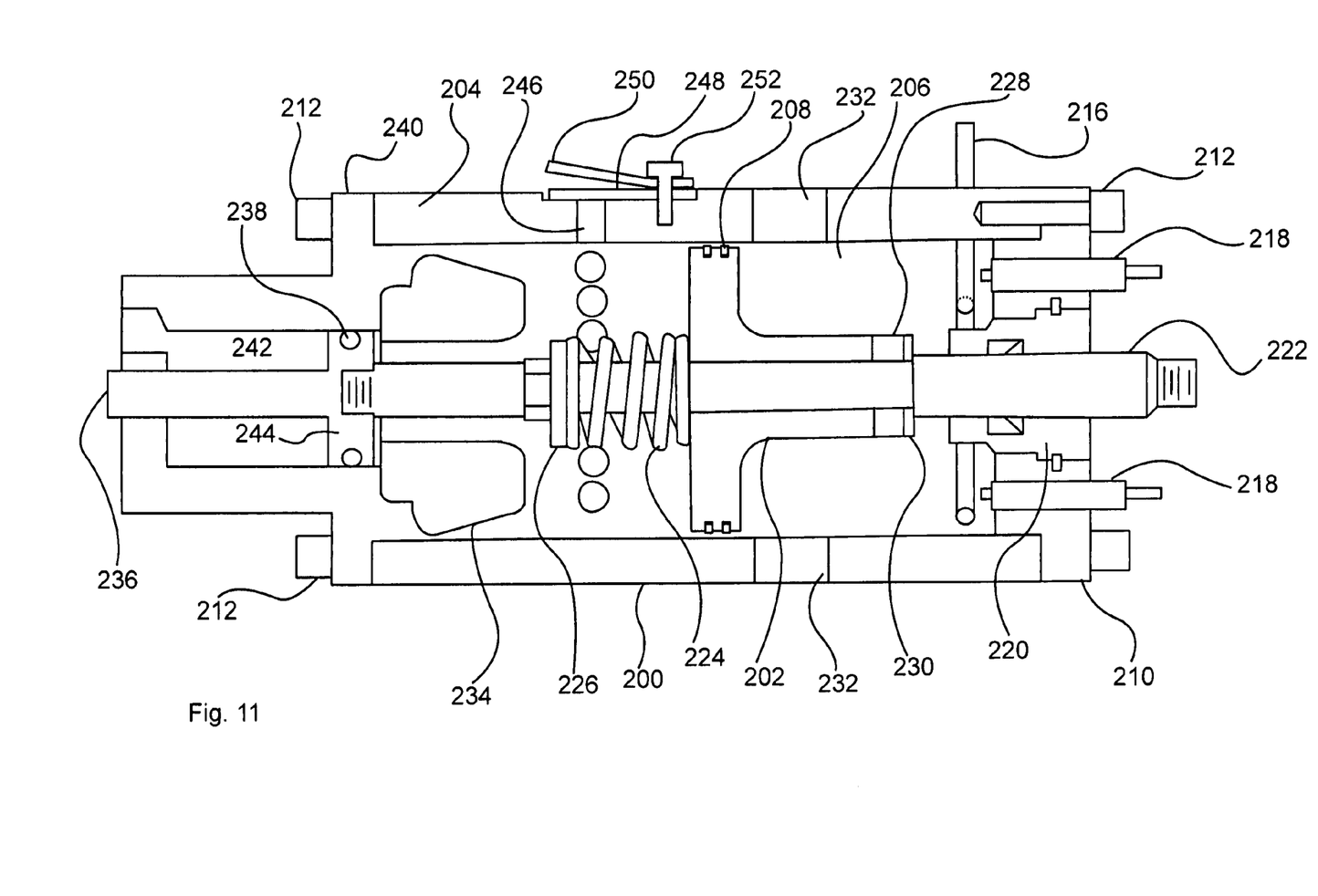
FIG. 11 is a cross-sectional view of a hydrogen operated tool.

An improved design for a hydrogen operated tool is disclosed in FIG. 11. The tool illustrated and described is a hydrogen operated rivet tool.

Specifically, the tool 200 includes a movable piston assembly 202 located in a housing 204. The piston assembly 202 is actuated by the combusting gases in the combustion chamber 206 defined by the housing 204 and piston assembly 202. The gases in the combustion chamber are hydrogen and ambient air. It should be noted that if desired combustion gases could also include oxygen mixed with the hydrogen and ambient air.

The piston assembly 202 is sealed to the inner wall of the housing 204 by piston rings 208. The chamber 206 is closed at its front end by a front plate assembly 210 secured to the housing 204 by cap screws 212.

The hydrogen gas supplied from a container such as container 68 in FIG. 2 is introduced into the combustion chamber 206 through a fuel introduction tube 216 that is located in the combustion chamber 206 adjacent to the front plate assembly 210. The front plate assembly 210 also contains ignition spark plugs 218 which ignite the hydrogen air/oxygen mixture when a high voltage electrical current is supplied. Also contained in the front plate assembly 210 is a seal assembly 220 that prevents the escape of the pressure impulse created by the burning hydrogen air/oxygen mixture.

A shaft 222 is provided to transfer the force of the driving piston assembly 202 to a pulling member (not shown) to set a rivet. In the illustrated configuration of the piston assembly 202 and shaft 222 a retracting force of the piston assembly 202 is shown but a pushing driving force could also be used. As is well known in the art if the combusting force is the driving force the positions of the various components would be located so the combustion chamber would be positioned so that the gases when combusted would act to positively move the drive shaft 222 to pull or set a rivet or the like into position and the gases would be subsequently exhausted after which a spring and vacuum would act to return the piston assembly 202 to where it is in position to be driven again.

To effect the retracting force a spring 224 is loosely disposed about the shaft 222 between the piston assembly 202 and a spring seat 226 secured to the shaft 222. This arrangement allows for a dampening action of the pressure impulse to overcome initial loads. The piston assembly 202 is held in place on the opposite end by an elastomeric bumper 228 and retaining washer 230. Ambient air is introduced into the combustion chamber 206 through intake ports 232. The intake ports 232 are closed after the introduction of ambient air by means of one way check valves (not shown).

The rear housing 240 is attached to the housing 204 by cap screw 212. the real housing 240 holds a bumper 234 that limits the amount of travel of the piston assembly 202. Also contained in the housing 204 opposite the driving/pulling piston assembly 202 is a deceleration piston shaft assembly 236 which controls the rate of the piston assembly 202 acceleration. The deceleration piston shaft assembly 236 is threadedly connected to shaft 222 and includes an o-ring 238 to seal the deceleration piston shaft assembly 236 to the rear housing 240. The air chamber 242 defined between the rear housing 240 and the piston 244 serves to dampen the movement of the piston shaft assembly 236.

When the gases in the chamber 206 are ignited the explosive action in the chamber 206 moves the piston assembly 202 to the left against the action of the spring 224 which spring 224 acts on the spring seat 226 to move the shaft 222 to the left. This rearward movement of the piston assembly 202 in the housing 204 uncovers a series of exhaust ports 246 in the housing 204. The spent gases push against reed valves 248 to exhaust the combustion byproduct to the atmosphere. The reed valves are limited in movement by limiting plates 250. The limiting plates are secured to the housing by valve retaining screws 252.

The exhausting of the combustion gases through the exhaust ports 246 result in a partial vacuum in chamber 206 which together with the positive spring force exerted by the spring 224 results in a positive driving action of the shaft 222.

Although a hydrogen ambient air system is illustrated a hydrogen-oxygen system could be used which would require an oxygen introduction tube similar to fuel introduction tube 216. The hydrogen and oxygen could be supplied under pressure controlled by a microprocessor control unit (not shown) through solenoid valves (not shown).

It is to be noted that in the case of the aforementioned tool and tool assemblage as well as the lawnmowers and fastener driving tools illustrated and disclosed herein, the hydrogen generator employed can be of various types. These include, in addition to the ones described in FIGS. 1 and 9, other forms of hydrogen generators such as a) a hydrocarbon fuel reformer, b) a proton exchange membrane generator, c) a pressure pulse generator wherein no compressor is needed and would include a stop/start generator which collects hydrogen generated under pressure and periodically releases oxygen generated into the atmosphere to maintain low pressure in the generation chamber, and d) a chemical generator utilizing acid/zinc or base/aluminum or a like reaction. As well as commercially available hydrogen.

We now turn to a unique and novel hydrogen operated lawnmower 100. The lawnmower 100 uses the environmentally desirable hydrogen as a fuel and the operator is not subject to gas fumes, nor the inconvenience of an electrical cord and, most importantly, it will start right up even in cold weather which is one of the main attributes of a hydrogen powered engine, which is not the situation with gas-fired engines.

Figure 7:
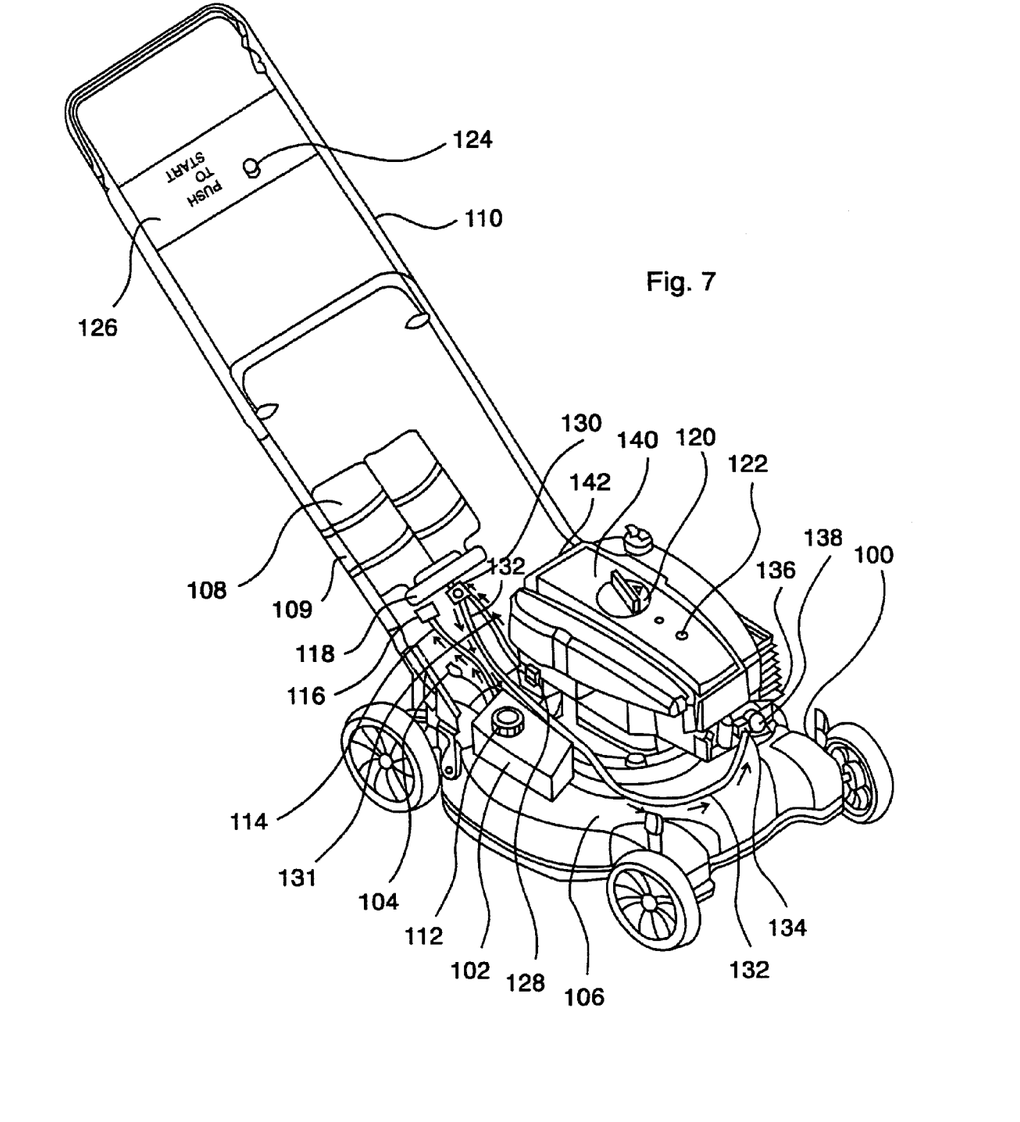
FIG. 7 illustrates a unique hydrogen operated lawnmower.

Referring now to FIG. 7, there is illustrated the novel lawnmower assembly 100 that is supplied hydrogen from the hydrogen generator 102 that is plugged into a 110 volt outlet via the power cord 104 when the lawnmower is in storage to generate a tank of hydrogen under the desired pressure. The generator 102 is schematically illustrated and may be similar in design to that shown in FIG. 1 or 9 but it is smaller in scale so it can fit into place on a base portion 106 of the lawnmower assembly 100. It may also be a different type of hydrogen generator as discussed above. The hydrogen generating capacity can be varied but is designed so that overnight it can readily fill the storage tanks 108 for use with the lawnmower assembly 100 the next day if desired. As shown, the tanks 108 are mounted to the frame 109 of the handle portion 110 of the lawnmower assembly 100 so the lawnmower will be capable of operating a minimum of 1–1½ hours without having to recharge the tanks 108. As aforementioned, when describing the novel hydrogen generator 10 illustrated in FIG. 1 the hydrogen is formed by electrolyzing the water located in the chamber containing water or, as in most cases, citric acid will be added to the water to facilitate the operation of the hydrogen generator 102. The water and citric acid is introduced to the generator through a fill cap 112. During the period of time that the generator is operating, the hydrogen gas is liberated from the water and flows through the high pressure supply hose 114, check valve 116, and into fuel tank manifold 118 to storage tanks 108. The generator 102 may include a compressor (not shown) to deliver hydrogen gas at a higher pressure to the storage tanks 108.

The storage tanks 108 will be readily filled overnight with hydrogen gas and the lawnmower is ready to be used to mow the lawn whenever desired thereafter.

To more fully understand the various component parts of the lawnmower and their operation your attention is again directed to FIG. 7.

To start the lawnmower, the starter indicator disk 120 is rotated until the arrows line up and the indicator LED 122 is illuminated. Following this, the start button 124, located in the handle panel 126, is depressed to activate the start sequence. The microprocessor 128 sends a signal to the high pressure solenoid 130 through wires 131 to deliver a prescribed amount of hydrogen gas through the high pressure delivery hose 132 to a high pressure injector 134 located in the cylinder head. Further depression of the start button 124 will activate a piezo crystal (not shown) which will send a high voltage impulse through high tension wire 136 to the spark plug igniter 138 to start the engine.

After the engine starts, the flywheel voltage generator 140 supplies voltage to the microprocessor 128 and high pressure solenoid 130. The engine's hydrogen injection timing is controlled by the microprocessor 128 using data from the flywheel position sensor 142.

Because of the highly combustive nature of hydrogen gas, the microprocessor can be programmed to stop the flow of hydrogen when the wheels stop rolling. This will conserve fuel. This is accommodated due to the ability to readily restart the engine.

Figure 12:
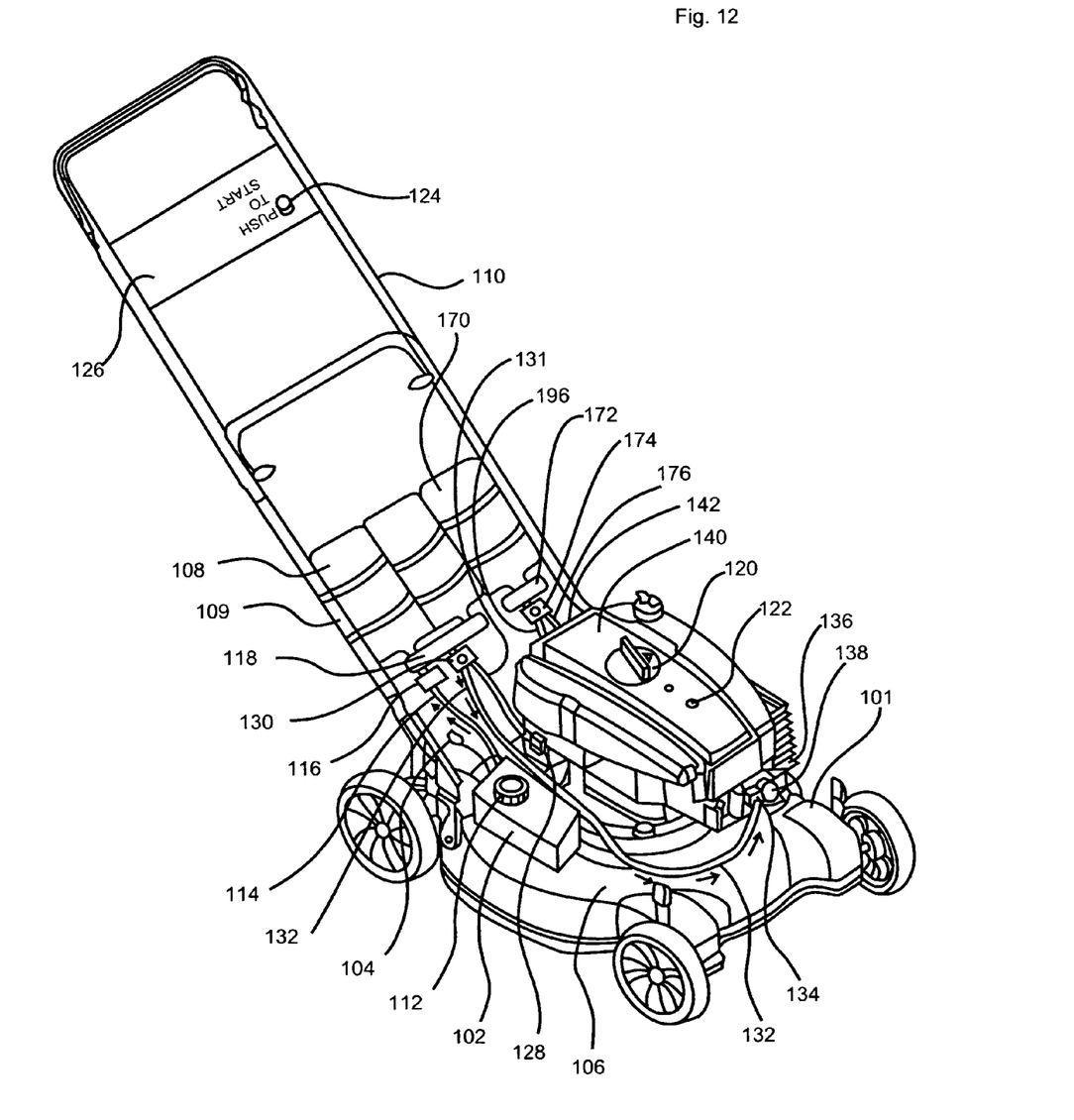
FIG. 12 illustrates a second embodiment of a hydrogen operated lawnmower.

Referring now to FIG. 12 there is an illustrated a second embodiment of a hydrogen operated lawnmower that is similar in many respects to the lawnmower of FIG. 7. Where the parts are identical in both embodiments the same reference numerals are used and the description thereof are set forth above when describing FIG. 7.

The novel lawnmower is indicated at 101 and differs from lawnmower 100 in that it includes an oxygen tank 170 in addition to the hydrogen tanks 108. The oxygen tank 170 is connected to an oxygen receiver 172. Connected to oxygen receiver 172 is oxygen solenoid 174 which is controlled by microprocessor 128 via wires 176. When desired oxygen is allowed to flow into the engine through high pressure oxygen hose 196, which allows for the introduction of more hydrogen gas so that more power can be produced by the same size engine. This is a means of boosting power, by utilizing oxygen instead of venting it to the atmosphere.

Figure 8:
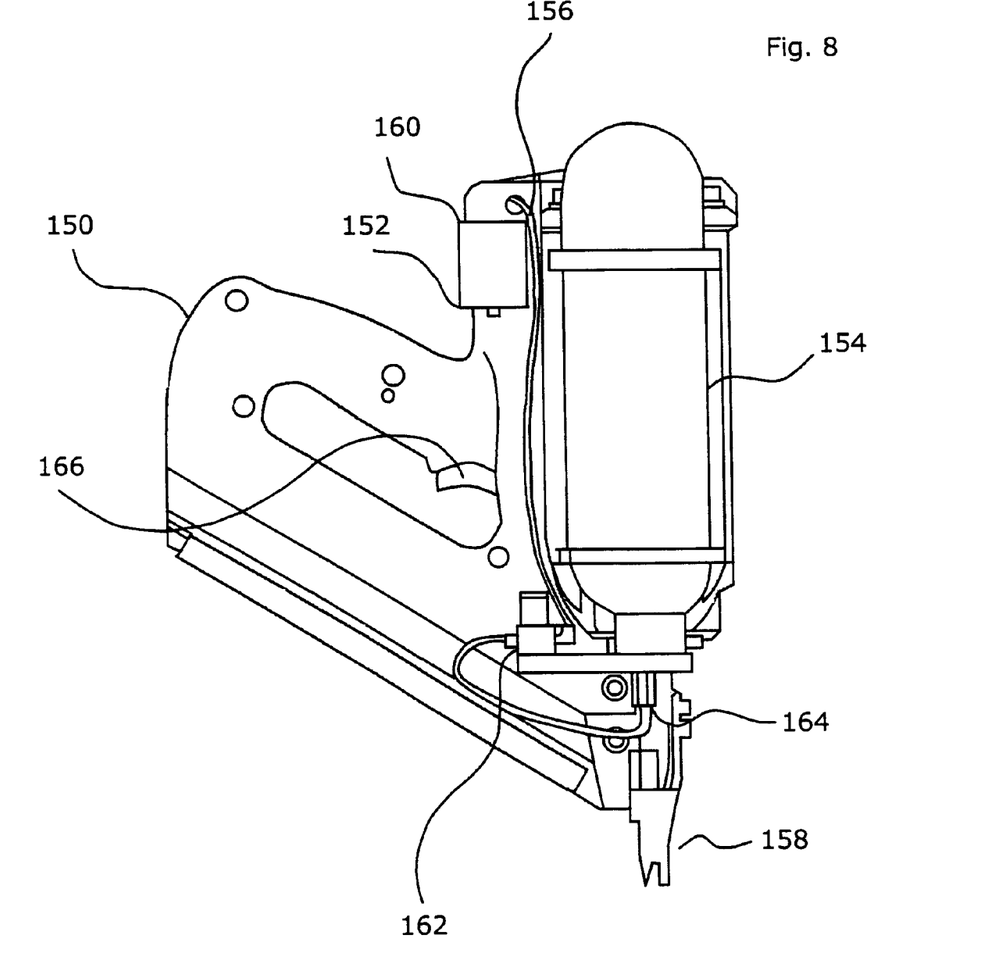
FIG. 8 discloses a novel hydrogen operated fastener driving tool.

We now turn to FIG. 8 which illustrates a hydrogen powered nail gun. The nail gun 150 is turned on by the power switch 152 which supplies battery voltage. The nail driving piston (not shown) has a nail driver (not shown) secured thereto which acts on a nail to drive it into receiving members. Hydrogen can be supplied directly from a hydrogen generator but as illustrated it is supplied from a refillable cylinder 154 through a hose 156 to a chamber above the nail driving piston. When it is desired to operate the gun the user places tool contact point 158 on the work surface and depresses contact point 158 to activate an internal switch (not shown). When the internal switch is activated a signal is sent to the microprocessor 160 which allows voltage to flow to solenoid 162 which is open for a prescribed number of milliseconds. The solenoid 162 opens a valve to allow hydrogen to flow out of the refillable cylinder 154 through high pressure tube 164 through solenoid 162 to supply hose 156.

After the solenoid 162 closes the user can depress piezo igniter 166 which sends a high voltage impulse through a high tension wire (not shown) to a spark point in the piston drive chamber to the hydrogen/air mixture in the driving chamber to drive the piston. The piezo igniter 166 will not fire unless the contact point 158 is depressed and the internal switch has been activated.

Figure 13:
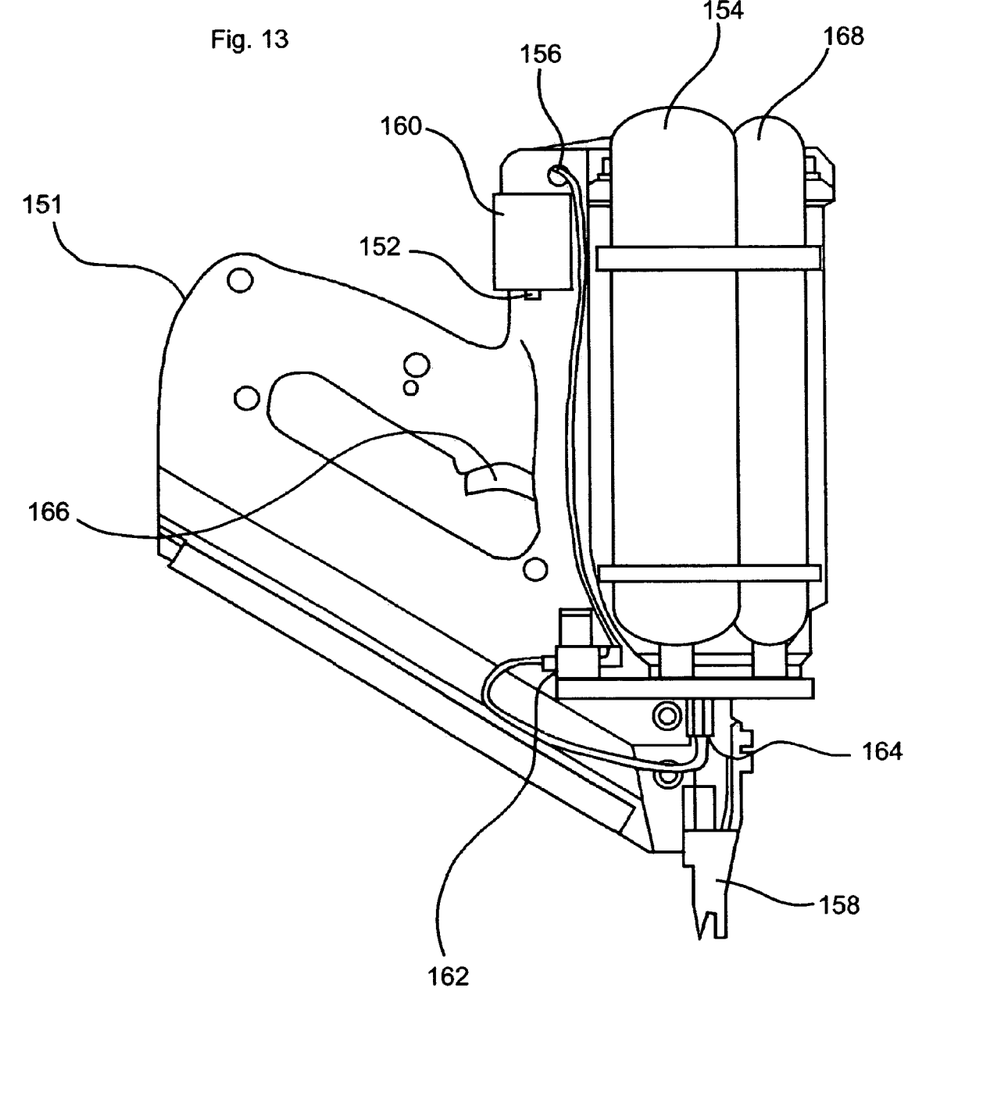
FIG. 13 illustrates a second embodiment of a hydrogen operated fastener driving tool.

In FIG. 13 there is disclosed a second embodiment of a novel hydrogen operated fastener driving tool. This tool 151 is similar in many respects to the fastener driving tool of FIG. 5 but further includes an oxygen tank 168 that allows for the introduction of oxygen in a manner similar to that discussed with respect to FIGS. 10 AND 12 to allow a smaller tool to drive large fasteners.

It is intended to cover by the appended claims all such embodiments that fall within the true spirit and scope of the invention.

What is claimed:

1. A hydrogen powered fastener gun comprising a frame means, fastener supply means, and a hydrogen supply, a power supply supported by said frame means, a housing defining a chamber, a driving piston in said chamber, means for controlling the supply of hydrogen to said chamber, and means for igniting the hydrogen in said chamber to move said piston to drive a fastener.

2. A hydrogen powered fastener gun as set forth in claim 1 in which the hydrogen supply is provided by a hydrogen generator.

3. A hydrogen powered fastener gun as set forth in claim 1 in which the hydrogen is supplied by means of a storage tank supported on said frame means.

4. A hydrogen powered fastener gun as set forth in claim 1 in which the means for controlling the flow of hydrogen includes a solenoid operated valve operated by a microprocessor that is actuated by an internal switch that activate a signal controlled by engagement of the tool with a work surface, which signal is sent to a microprocessor that allows voltage to operate the solenoid operated valve to allow hydrogen to flow out of the hydrogen tank into the housing chamber.

5. A hydrogen powered fastener gun as set forth in claim 1 in which the mans for igniting the hydrogen in said chamber includes a trigger mechanism that sends a high voltage impulse to a spark point in the piston drive chamber containing hydrogen to drive the piston.

6. A hydrogen powered fastener gun as set forth in claim 1 which includes an oxygen tank that allows for the introduction of oxygen to said chamber to increase the driving force of said driving piston.

* * * * *